United States Patent
Sakagawa et al.

(10) Patent No.: US 8,103,594 B2
(45) Date of Patent: Jan. 24, 2012

(54) INFORMATION PROCESSING APPARATUS

(75) Inventors: Takashi Sakagawa, Hachiouji (JP); Ayako Hosoi, Fuchu (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 171 days.

(21) Appl. No.: 11/724,507

(22) Filed: Mar. 15, 2007

(65) Prior Publication Data
US 2007/0239618 A1  Oct. 11, 2007

(30) Foreign Application Priority Data

Mar. 24, 2006 (JP) ............................... P2006-083348

(51) Int. Cl.
*G06F 21/00* (2006.01)
(52) U.S. Cl. ............................... 705/59; 705/51; 705/64
(58) Field of Classification Search .................... 705/59, 705/26
See application file for complete search history.

(56) References Cited

U.S. PATENT DOCUMENTS

| | | | | |
|---|---|---|---|---|
| 5,671,412 A | * | 9/1997 | Christiano | 707/104.1 |
| 5,790,664 A | * | 8/1998 | Coley et al. | 709/203 |
| 5,892,900 A | * | 4/1999 | Ginter et al. | 726/26 |
| 6,023,766 A | * | 2/2000 | Yamamura | 726/29 |
| 6,169,976 B1 | * | 1/2001 | Colosso | 705/59 |
| 6,208,996 B1 | * | 3/2001 | Ben-Shachar et al. | 1/1 |
| 6,343,280 B2 | * | 1/2002 | Clark | 705/55 |
| 6,411,941 B1 | * | 6/2002 | Mullor et al. | 705/59 |
| 7,024,466 B2 | * | 4/2006 | Outten et al. | 709/219 |
| 7,206,748 B1 | * | 4/2007 | Gruse et al. | 705/51 |
| 7,328,453 B2 | * | 2/2008 | Merkle et al. | 726/23 |
| 7,343,495 B2 | * | 3/2008 | Kambayashi et al. | 713/193 |
| 7,383,205 B1 | * | 6/2008 | Peinado et al. | 705/26 |
| 7,702,590 B2 | * | 4/2010 | Malik | 705/59 |
| 2003/0152222 A1 | * | 8/2003 | Nakano et al. | 380/201 |
| 2003/0224762 A1 | * | 12/2003 | Lau et al. | 455/412.2 |
| 2005/0283440 A1 | * | 12/2005 | Saeki et al. | 705/59 |
| 2005/0286497 A1 | * | 12/2005 | Zutaut et al. | 370/352 |
| 2006/0242073 A1 | * | 10/2006 | Padawer et al. | 705/51 |
| 2006/0259434 A1 | * | 11/2006 | Vilcauskas et al. | 705/57 |
| 2006/0262924 A1 | * | 11/2006 | Weiss et al. | 379/413.01 |
| 2007/0067243 A1 | * | 3/2007 | Malik | 705/59 |

FOREIGN PATENT DOCUMENTS

| | | |
|---|---|---|
| JP | 2001-265662 | 9/2001 |
| JP | 2003-256062 A | 9/2003 |
| JP | 2006-065737 A | 3/2006 |

OTHER PUBLICATIONS

Japanese Office Action dated Jun. 28, 2011 (and English translation thereof) in counterpart Japanese Application No. 2006-083348.

* cited by examiner

*Primary Examiner* — Evens J Augustin
(74) *Attorney, Agent, or Firm* — Holtz, Holtz, Goodman & Chick, P.C.

(57) ABSTRACT

According to an aspect of the invention, there is provided an information processing apparatus including: a storage unit configured to store a content which is limited in use based on a license information, the license information being correlated with the content; a control unit configured to determine whether or not the content is available based on the license information; and a notification unit configured to notify an information associated state of use if the control unit determines that the content is available under a predetermined condition.

20 Claims, 14 Drawing Sheets

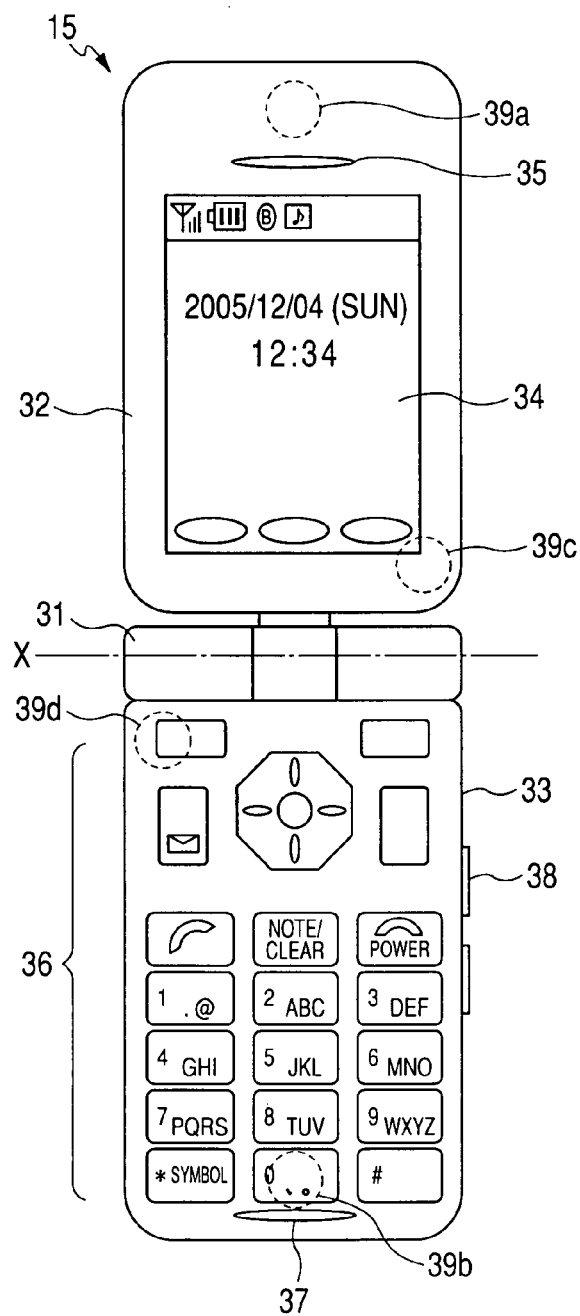
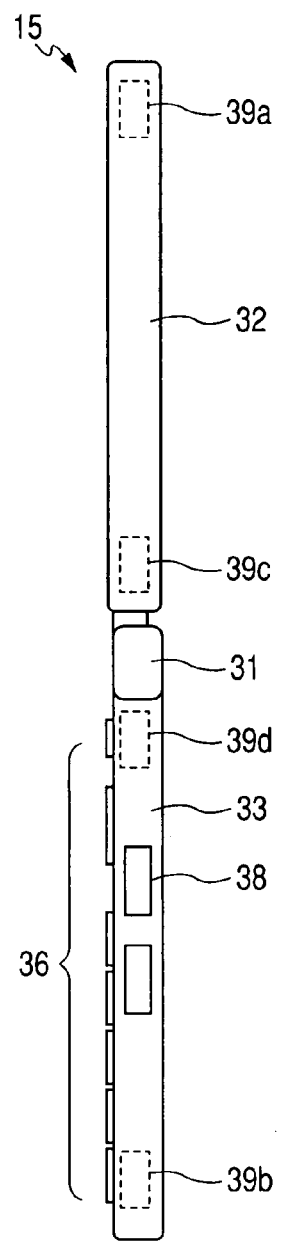

FIG. 9

| SETUP | CONTENTS NAME | USING LIMITATION INFORMATION | AVAILABLE USE COUNT | USING STATE | USING STATE NOTIFICATION TIME |
|---|---|---|---|---|---|
| WALLPAPER | CONTENTS A | FEB 28 18:00 | | USING ENABLED STATE | FEB 26 18:00 |
| RINGTONE | CONTENTS B | MAR 5 3:30 | | USING ENABLED STATE | MAR 3 9:00 |
| NONAPPLICABLE | CONTENTS C | 10 TIMES | 3 | USING ENABLED STATE | 2 |
| NONAPPLICABLE | CONTENTS D | 5 TIMES | 0 | USING DISABLED STATE | 2 |
| NONAPPLICABLE | CONTENTS E | MAR 6 17:47 | | USING ENABLED STATE | MAR 4 19:00 |
| ... | ... | ... | ... | ... | ... |

FIG. 10

| SETUP | CONTENTS NAME | USING LIMITATION INFORMATION | AVAILABLE USE COUNT | USING STATE | USING STATE NOTIFICATION TIME |
|---|---|---|---|---|---|
| WALLPAPER | CONTENTS A | FEB 28 18:00 | | USING DISABLED STATE | FEB 26 18:00 |
| RINGTONE | CONTENTS B | MAR 5 3:30 | | USING ENABLED STATE | MAR 3 9:00 |
| NONAPPLICABLE | CONTENTS C | 10 TIMES | 3 | USING ENABLED STATE | 2 |
| NONAPPLICABLE | CONTENTS D | 5 TIMES | 0 | USING DISABLED STATE | 2 |
| NONAPPLICABLE | CONTENTS E | MAR 6 17:47 | | USING ENABLED STATE | MAR 4 19:00 |
| ... | ... | ... | ... | ... | ... |

| USER ID | LICENSE ID | CONTENTS ID | CONTENTS NAME | ACQUISITION REQUEST USE INFORMATION |
|---|---|---|---|---|
| 000011 | 112000 | 000125 | CONTENTS A | TEN DAYS |

FIG. 16

| SETUP | CONTENTS NAME | USING LIMITATION INFORMATION | AVAILABLE USE COUNT | USING STATE | USING STATE NOTIFICATION TIME |
|---|---|---|---|---|---|
| WALLPAPER | CONTENTS A | MAR 11 14:30 | | USING ENABLED STATE | MAR 9 14:30 |
| RINGTONE | CONTENTS B | MAR 5 3:30 | | USING ENABLED STATE | MAR 3 9:00 |
| NONAPPLICABLE | CONTENTS C | 10 TIMES | 3 | USING ENABLED STATE | 2 |
| NONAPPLICABLE | CONTENTS D | 5 TIMES | 0 | USING DISABLED STATE | 2 |
| NONAPPLICABLE | CONTENTS E | MAR 6 17:47 | | USING ENABLED STATE | MAR 4 19:00 |
| ... | ... | ... | | ... | ... |

FIG. 17

| SETUP | CONTENTS NAME | USING LIMITATION INFORMATION | AVAILABLE USE COUNT | USING STATE | USING STATE NOTIFICATION TIME |
|---|---|---|---|---|---|
| WALLPAPER | CONTENTS A | MAR 3 14:05 | | USING ENABLED STATE | MAR 1 14:05 |
| RINGTONE | CONTENTS B | MAR 5 3:30 | | USING ENABLED STATE | MAR 3 9:00 |
| NONAPPLICABLE | CONTENTS C | 10 TIMES | 3 | USING ENABLED STATE | 2 |
| NONAPPLICABLE | CONTENTS D | 5 TIMES | 0 | USING DISABLED STATE | 2 |
| NONAPPLICABLE | CONTENTS E | MAR 6 17:47 | | USING ENABLED STATE | MAR 4 19:00 |
| ... | ... | ... | | ... | ... |

FIG. 20

| MANAGEMENT NO. | USER ID | USER NAME | LICENSE ID | CONTENTS ID | CONTENTS NAME | USING LIMITATION INFORMATION |
|---|---|---|---|---|---|---|
| 0001 | 000005 | TARO AOKI | 000138 | 000038 | CONTENTS A | MAR 20 12:30 |
| | | | 000098 | 000101 | CONTENTS P | 10 TIMES |
| 0002 | 000011 | HANAKO YAMADA | 112000 | 000125 | CONTENTS A | FEB 28 18:00 |
| ... | ... | ... | ... | ... | ... | ... |

FIG. 21

| MANAGEMENT NO. | USER ID | LICENSE ID | CONTENTS ID | CONTENTS NAME | USING LIMITATION INFORMATION |
|---|---|---|---|---|---|
| 0002 | 000011 | 112001 | 000125 | CONTENTS A | MAR 11 14:30 |

FIG. 22

| MANAGEMENT NO. | USER ID | USER NAME | LICENSE ID | CONTENTS ID | CONTENTS NAME | USING LIMITATION INFORMATION |
|---|---|---|---|---|---|---|
| 0001 | 000005 | TARO AOKI | 000138 | 000038 | CONTENTS A | MAR 20 12:30 |
| | | | 000098 | 000101 | CONTENTS P | 10 TIMES |
| 0002 | 000011 | HANAKO YAMADA | 112001 | 000125 | CONTENTS A | MAR 11 14:30 |
| ... | ... | ... | ... | ... | ... | ... |

INFORMATION PROCESSING APPARATUS

CROSS-REFERENCE TO RELATED APPLICATIONS

This application is based on and claims the benefit of priority from the prior Japanese Patent Application No. 2006-83348, filed on Mar. 24, 2006; the entire contents of which are incorporated herein by reference.

BACKGROUND

1. Technical Field

The present invention relates to an information processing apparatus, and relates in particular to an information processing apparatus that can improve the use of contents managed based on licensing information.

2. Description of Related Art

As digital technology has been developed, digital contents, such as ringtone melodies for mobile phones and games for mobile phones, can be provided for mobile phones and information processing apparatuses through a network, such as the Internet.

Unlike analog contents, the quality of digital contents is not deteriorated through the repetitive copying of the contents. Once digital contents are distributed on the market, the contents can be copied by an unauthorized party to a mobile phone, or to an information processing apparatus, without permission of the copyright holder of the contents.

Therefore, for the sale of digital contents to users, content providers supply licensing information for the users that authorizes them to use the contents, and this tends to reduce the possibility that the contents will be used by unauthorized users who have not obtained licensing information (i.e., users who do not purchase contents through the proper channels). The contents for which licensing information is provided at the time of purchase are defined as "contents managed based on licensing information".

Recently, of the contents on the market that are managed using licensing, there are some that users can secure for unlimited, monthly using by paying several hundred yen each month, and some (hereinafter referred to as "use limited contents"), for which use is made of copyright protected file forms (OMA Separate Delivery forms), such as those used for display wallpapers for information processing apparatuses or for ringtone melodies used for mobile phones, for which limitations are imposed in advance on usage periods or on usage frequency factors, that are based on licensing information. Unlike use limited contents for which usage periods are limited, use limited contents for which the number of times used is limited in advance can not be designated for use for display wallpapers or for ringtones.

When for contents a predesignated limited usage period has expired or a limited number of times allocated for use of the contents has been reached, the use of the contents is thereafter inhibited, and a user can no longer use (reproduce or display) the contents.

However, assume that there is a difference between the timer incorporated in a user's mobile phone or information processing apparatus and the timer in a contents server operated by a contents provider. In this case, although the use period for the use limited contents was previously established, as stipulated using licensing information, the use of the contents can not be inhibited exactly at the time designated for the expiration of the use period.

Therefore, a method has been proposed whereby a use time period and time differential information for the internal clock are provided in advance as contents information, and the contents information is transmitted to a client apparatus (see, for example, JP-A-2001-265662).

According to the method disclosed in JP-A-2001-265662, upon the distribution of contents, a contents provider and a user conclude an agreement on the use period, and when a time difference occurs in the clock of a device following the distribution of the contents, the elapsed time for the use period can be determined exactly. Therefore, when the use limit that the contents provider desires is reached, the use of the contents can be accurately inhibited.

SUMMARY

When for use limited contents a use time has expired, or the number of times the contents may be used has been reached, a user will no longer be able to use the pertinent contents. Therefore, when the user desires to continue to use limited contents for which the use period has expired, or the number of times permitted to use has been reached, the user must purchase, from the contents provider, licensing information for the same use limited contents.

However, generally, when use limited contents can no longer be used (can not be reproduced or displayed), only then does a user realize that as originally stipulated, based on licensing information, a permitted use time period has expired or the number of times contents can be used has been reached. That is, for a user it is a troublesome process, before expiration of a period permitted to use, or before the number of times use is permitted has been reached, as previously stipulated, to examine the using state of use limited contents that are being used, i.e., to determine when permission to use the contents will have expired. Thus, users seldom examine the using state of use limited contents in advance.

Furthermore, when a user desires to continue to use contents for which the period permitted to use has expired, or the number of times permitted to use has been reached, the user must again purchase licensing information for the contents from the contents provider. But oft times, it is difficult for a user, before permission to use limited contents has expired, to purchase additional licensing information and to thus obtain an extended use period.

Also, when a user desires to use limited contents differing from those for which permission to use has expired, the user must determine which use limited contents for which using is desired, and purchase them, along with licensing information, from a contents server managed by another contents provider. For the user, this is very troublesome process.

As described above, when using use limited contents, it is not easy for a user to ascertain their current using state before the period permitted to use, previously established, based on licensing information, has expired, and utilization of the use limited contents is poor.

The present invention has been made in view of the above circumstances and provides an information processing apparatus. According to an aspect of the invention, an information processing apparatus can provide improved utilization of use limited contents for which their management is based on licensing information.

According to another aspect of the invention, there is provided an information processing apparatus including: a storage unit configured to store a content which is limited in use based on a license information, the license information being correlated with the content; a control unit configured to determine whether or not the content is available based on the license information; and a notification unit configured to notify an information associated state of use if the control unit determines that the content is available under a predetermined condition.

BRIEF DESCRIPTION OF THE DRAWINGS

In the accompanying drawings;

FIGS. 2A and 2B are exemplary front view and a side view of the external appearance of a camera-equipped digital camera mobile phone shown in FIG. 1, when opened to about 180 degrees;

FIG. 9 is an exemplary diagram showing an example structure for a contents management database stored in a storage unit in FIG. 4;

FIG. 10 is an exemplary diagram showing another example structure for the contents management database stored in the storage unit in FIG. 4;

FIG. 16 is an exemplary diagram showing an additional example structure for the contents management database stored in the storage unit in FIG. 4;

FIG. 17 is an exemplary diagram showing a further example structure for the contents management database stored in the storage unit in FIG. 4;

FIG. 20 is an exemplary diagram showing an example structure for licensing data managed in a license data database in FIG. 5;

FIG. 21 is an exemplary diagram showing an example structure for licensing data generated by a data processor in FIG. 5; and FIG. 22 is an exemplary diagram showing another example structure for the licensing data managed in the license data database in FIG. 5.

DESCRIPTION OF THE EMBODIMENTS

One embodiment of the present invention will now be described while referring to drawings.

Figure 1:
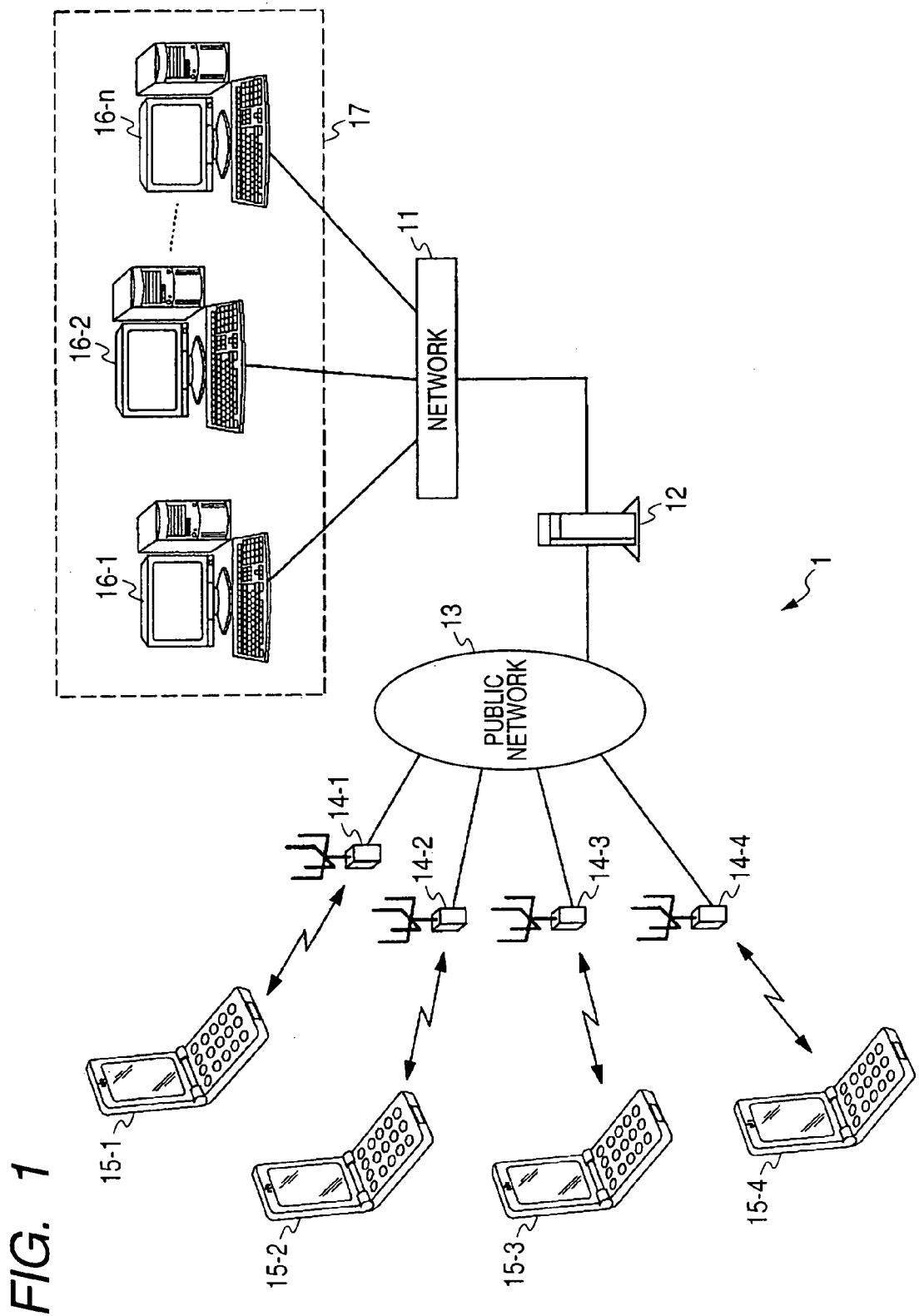
FIG. 1 is an exemplary schematic diagram illustrating a general configuration of a network system according to an embodiment of the invention.

FIG. 1 is a diagram showing the general configuration of a network system 1 for which the present invention is applied.

In a network system 1, base stations 14-1 to 14-4, which are fixed radio stations, are located in cells that are obtained by dividing a communication service area into desired sizes. Digital mobile phones 15-1 to 15-4 equipped with cameras, which are mobile radio stations, are connected to the base stations 14-1 to 14-4 by a code division multiple access method called W-CDMA (Wideband-Code Division Multiple Access), for example, and by using a frequency band of 2 [GHz], for example, a large volume of data can be exchanged at a maximum high data transfer rate of 2 [Mbps].

As described above, since the digital mobile phones 15-1 to 15-4 equipped with cameras can exchange a large volume of data at a high speed using the W-CDMA system, not only speech communication, but also various forms of data communication, such as the transmission/reception of email, the browsing of simplified homepages and the transmission/reception of pictures, can be performed.

The base stations 14-1 to 14-4 are connected, by wire, to a public network 13, and an access server 12 for an Internet service provider is connected to the public network 13. A contents providing apparatus 17, including contents servers 16-1 to 16-$n$, is connected to the access server 12 across a network 11, such as the Internet, a LAN (Local Area Network), a WAN (Wide Area Network) or another arbitrary network.

In the following explanation, when the digital mobile phones 15-1 to 15-4 equipped with cameras need not be separately identified, they are generally called camera-equipped digital mobile phones 15. Further, the base stations 14-1 to 14-4 and the contents servers 16-1 to 16-$n$ are also generally called base stations 14 and contents servers 16 when they need not be separately identified.

FIGS. 2A and 2B are diagrams showing the external appearance of a camera-equipped digital mobile phone 15 in FIG. 1. FIG. 2A is a front view of the external appearance of the camera-equipped digital mobile phone 15 opened to an angle of about 180 degrees. FIG. 2B is a side view thereof.

As shown in FIGS. 2A and 2B, the camera-equipped digital mobile phone 15 is formed of a first case 32 and a second case 33, joined together by a center hinge 31, at which it can be folded. A transmission/reception antenna (an antenna 64 in FIG. 4, which will be described later) is located at a predetermined position inside the camera-equipped digital mobile phone 15, which exchanges radio waves with the base station 14 through the incorporated antenna.

A liquid display panel 34 is arranged on the front of the first case 32 to display the radio reception state, the remaining battery power, the names of persons and their telephone numbers registered in a telephone address book, the transmission history, the contents of email, simplified homepages, photographs made by a CCD camera (a CCD camera 40 in FIG. 3, which will be described later), contents received by an external contents server 16 (use limited contents or use unlimited contents), or contents stored on a memory card 66 (use limited contents or use unlimited contents). Further, a loudspeaker 35 is provided, at a predetermined position above the liquid crystal display panel 34, that a user can use for oral communication.

Further, operation keys 36, such as numeral keys from "0" to "9", a dialing key, a redial key, an oral communication end/power key, a clear key and an email key, are provided on the surface of the second case 33, where they can be used for the entry of various instructions.

Furthermore, in the upper portion of the second case 33, a direction key and an enter key are provided that also function as operation keys 36. These keys can be used to perform a variety of operations. Specifically, when a user manipulates the direction key, a cursor on the liquid crystal display panel 34 can be moved up or down or to the right or left, and can be used to scroll through a telephone book list or an email, to turn the pages of a simplified homepage and to load pictures for viewing.

Further, various other functions can be performed by pressing the enter key. For example, when by manipulating the direction key on the second case 33 a user selects a desired telephone number, from a list displayed on the liquid crystal display panel 34, and the enter key on the second case 33 is depressed, the selected telephone number is established and the number is dialed.

Also provided for the second case 33 is an email key, positioned to the left of the direction and enter keys. When this key is depressed on the second case 33, an email transmission/reception function is initiated. Further, provided to the right of the direction and enter keys is a browser key that when pressed establishes a connection to a Web, for example.

Furthermore, a microphone 37 is arranged on the second case 33, below the operation keys 36, for collecting and transmitting the voice of a user. And in addition, a side key 38 is provided on the second case 33 for operating the camera-equipped mobile phone 15.

A battery pack (not shown) is inserted into the second case 33, through the rear face. And when the speech end/power key is depressed, power from the battery pack is supplied to individual included circuits to ready them for operation.

In the lower portion of the second case 33, a memory card slot is formed at a predetermined position for the insertion of a detachable memory card (a memory card 66 in FIG. 4, which will be described later). When a memo button (not shown) is depressed, the voice of a person with whom a user is speaking on the phone is recorded on the memory card, or an email, a simplified homepage, or a picture obtained using a CCD camera is recorded in response to a manipulation performed by the user.

The memory card is a type of flash memory card; a small, thin plastic case wherein is stored a flash memory device, which is a type of EEPROM (Electrically Erasable and Programmable Read Only Memory), a nonvolatile memory, for which the rewriting and erasure of data is electrically enabled. By using a 10-pin terminal, the writing and reading of various types of data, such as picture data, audio data and music data, can be performed.

Further, for the memory card, high speed performance is provided by using a unique serial protocol such that compatibility is available for an apparatus used, even though the specifications for the incorporated memory are changed due to an increase in the memory capacity. Furthermore, high reliability is obtained by providing an erroneous erasure prevention switch.

Therefore, since the above described memory card can be inserted into the camera-equipped mobile phone 15, through the memory card, the camera-equipped mobile phone 15 can use data in common with another electronic apparatus.

Furthermore, magnetic sensors 39a, 39b, 39c and 39d, for detecting the state of the camera-equipped phone mobile 15, are located at predetermined positions inside the first case 32 and the second case 33. With this arrangement, the current state of the camera-equipped mobile phone 15 can be detected.

Figure 3A:
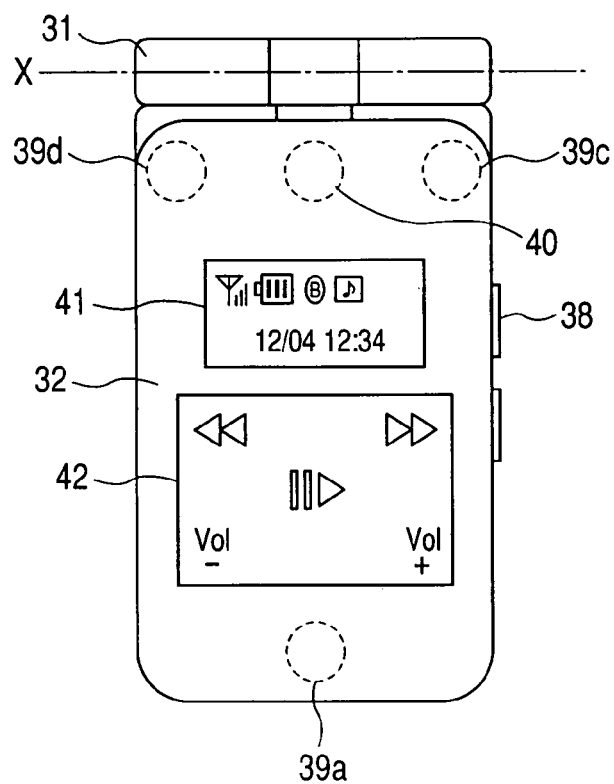
FIGS. 3A and 3B are exemplary front view and a side view of the external appearance of the camera-equipped digital camera mobile phone shown in FIG. 1 when closed.
Figure 3B:
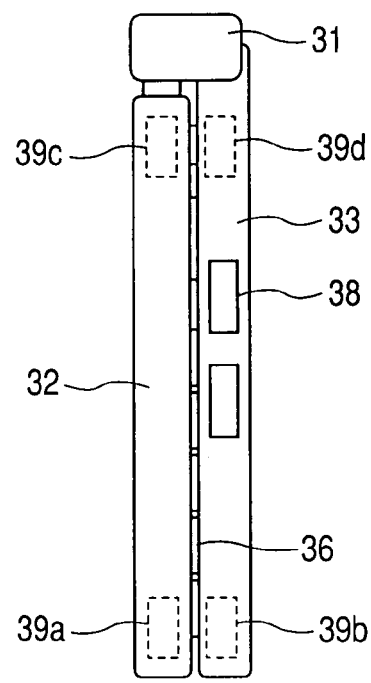

FIGS. 3A and 3B are diagrams showing the external appearance of the camera-equipped digital mobile phone 15 shown in FIG. 1. FIG. 3A is a front view of the external appearance of the camera-equipped digital mobile phone 15 in the closed state, and FIG. 3B is a side view thereof.

A CCD camera 40 is located in the upper portion of the first case 32 to obtain a picture of a desired object. A sub-display panel 41 is provided below the CCD camera 40. An antenna pictograph, indicating the current sensitivity level of an antenna, a battery pictograph, indicating the current battery power of the camera-equipped digital mobile phone 15 and the current time are displayed on the sub-display panel 41.

An electrostatic touch pad 42 is located below the sub-display panel 41. For the electrostatic touchpad 42, which looks like a single touch pad, sensors are located at a plurality of places. When a sensor detects a depression made by a user in the vicinity of the sensor, a reversing function, a fast forward function, a volume lowering operation, a volume raising operation, a playing operation or a pausing operation is performed.

Figure 4:
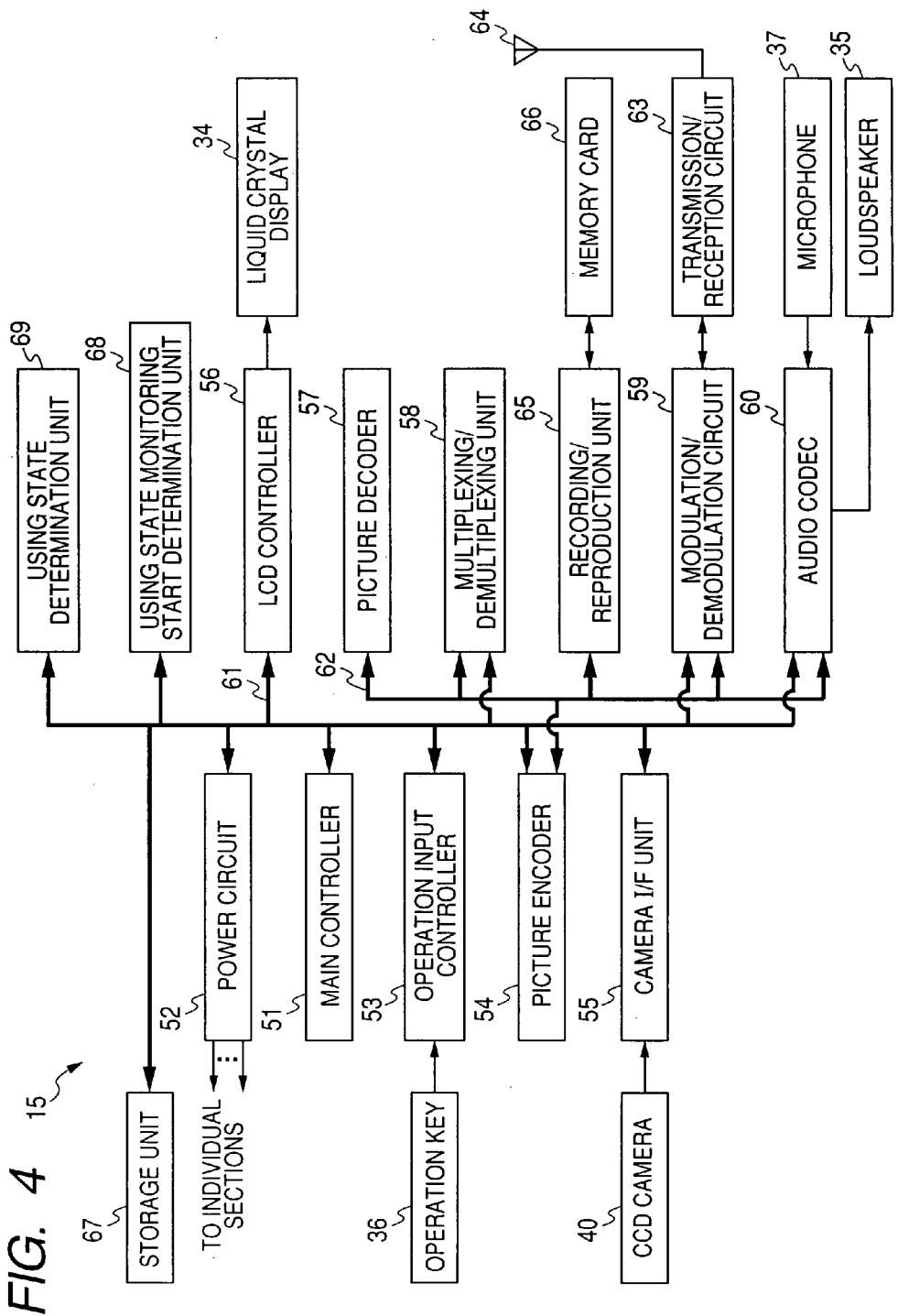
FIG. 4 is an exemplary block diagram showing the internal arrangement of the camera-equipped digital mobile phone shown in FIG. 1.

FIG. 4 is a diagram showing the internal configuration of the camera-equipped digital mobile phone 15.

As shown in FIG. 4, in the camera-equipped digital mobile phone 15, a power circuit 52, an operation input controller 53, a picture encoder 54, a camera interface unit 55, an LCD (Liquid Crystal Display) controller 56, a multiplexing/demultiplexing unit 58, a modulation/demodulation circuit 59, an audio codec 60, a storage unit 67, an using state monitoring start determination unit 68 and an using state determination unit 69 are connected, by a main bus 61, to a main controller 51 that controls all the individual sections of the first case 32 and the second case 33. Further, the picture encoder 54, a picture decoder 57, the multiplexing/demultiplexing unit 58, the modulation/demodulation circuit 59, the audio codec 60 and a recording/reproduction unit 65 are interconnected by a sync bus 62.

When a user manipulates and turns on the speech end/power key, the power circuit 52 supplies power from the battery pack to the individual sections of the camera-equipped digital mobile phone 15 to prepare them for operation.

The main controller 51, which includes a CPU, a ROM and a RAM, generates various control signals and supplies these signals to the individual sections to control the entire camera-equipped digital mobile phone 15. It should be noted that a timer for accurately measuring the current date and time is incorporated in the main controller 51.

In the camera-equipped digital mobile phone 15, based on control provided by the main controller 51, the audio codec 60 converts into a digital audio signal an audio signal collected by the microphone 37 in the audio speech mode, and compresses the digital audio signal. The modulation/demodulation circuit 59 performs a spectrum spreading modulation for this digital audio signal, and a transmission/reception circuit 63 performs a digital/analog conversion and a frequency conversion for the resultant signal and transmits the thus obtained signal through an antenna 64.

Also in the camera-equipped digital mobile phone 15, the transmission/reception circuit 63 amplifies a signal received at the antenna 64 in the audio speech mode, and performs a frequency conversion and an analog/digital conversion for the amplified signal. Then, the modulation/demodulation circuit 59 performs the spectrum despreading demodulation and the audio codec 60 expands the resultant signal to obtain an analog audio signal that it then outputs through the loudspeaker 35.

Further, for the transmission of email in the data communication mode of the camera-equipped digital mobile phone 15, text data for email, entered by the manipulation of the operation keys 36, is transmitted to the main controller 51 through the operation input controller 53. Under the control of the main controller 51, the modulation/demodulation circuit 59 performs a spectrum spreading modulation for the text data, and the transmission/reception circuit 63 performs a digital/analog conversion and a frequency conversion for the text data, and outputs the resultant data to the base station 14 through the antenna 64.

On the other hand, for the reception of email in the data communication mode of the camera-equipped digital mobile phone 15, the modulation/demodulation circuit 59 performs a spectrum despreading demodulation for a signal that is received from the base station 14 through the antenna 64, and reproduces the original text data. Then, the LCD controller 56 displays the text data, as email, on the liquid display panel 34.

Also thereafter, the recording/reproduction unit 65 in the camera-equipped digital mobile phone 15 can record the received email on a memory card 66, in response to an operation performed by a user.

When the camera-equipped digital mobile phone 15 is not transmitting a picture signal, a picture signal obtained by the CCD camera 40 is directly displayed on the liquid crystal display panel 34, through the camera interface unit 55 and the LCD controller 56.

When the camera-equipped digital mobile phone 15 transmits a picture signal in the data communication mode, a picture signal obtained by the CCD camera 40 is transmitted to the picture encoder 54 through the camera interface unit 55.

The picture encoder 54 converts the picture signal received from the CCD camera 40 into a coded picture signal by compressing it using a predetermined coding system, such as MPEG (Moving Picture Experts Group) 4, and transmits the thus obtained coded picture signal to the multiplexing/demultiplexing unit 58. At the same time, as a digital audio signal in the camera-equipped digital mobile phone 15, the audio codec 60 also transmits to the multiplexing/demultiplexing unit 59 sounds that were collected by the microphone 37 while photographs were being taken by the CCD camera 40.

The multiplexing/demultiplexing unit 59 uses a predetermined method for multiplexing a coded picture signal, received from the picture encoder 54, and an audio signal, received from the audio codec 60. Then, the modulation/demodulation circuit 59 performs a spectrum spreading modulation for the multiplexed signal, and the transmission/reception circuit 63 performs a digital/analog conversion and a frequency conversion for the resultant signal, and transmits the signal through the antenna 64.

On the other hand, when in the data communication mode the camera-equipped digital mobile phone 15 receives data for an animated picture file that is linked, for example, to a simplified homepage, the modulation/demodulation circuit 59 performs a spectrum despreading demodulation for a signal received from the base station 14, via the antenna 64, and transmits the thus obtained multiplexed signal to the multiplexing/demultiplexing unit 58.

The multiplexing/demultiplexing unit 58 demultiplexes the multiplexed signal to obtain a coded picture signal and an audio signal, and transmits the coded picture signal to the picture decoder 57 and the audio signal to the audio codec 60 across the sync bus 62. The picture decoder 57 obtains the original animated picture signal by decoding the coded picture signal using a decoding method, such as MPEG4, that is consonant with the predetermined coding method, and transmits the obtained animated picture signal to the liquid crystal panel 34 through the LCD controller 56. Thus, animated picture data are displayed that are included in the animated picture file that is linked to the simplified homepage.

At the same time, the audio codec 60 converts the audio signal into an analog audio signal that it transmits to the loudspeaker 35. Thus, the audio signal that is included in the animated picture file linked to the simplified home page is reproduced. Also in this case, as for email, the recording/reproduction unit 65 of the camera-equipped digital mobile phone 15, in consonance with user manipulation, can record on the memory card 66 data that is linked to the simplified homepage.

The storage unit 67 stores a plurality of use limited contents, as well as license data for the use limited contents, received by the transmission/reception circuit 63 from the contents server 16 via the network 11, and transmits these data to the recording/reproduction unit 65, as needed. Further, the storage unit 67 also includes a contents management database in which the names of use limited contents, information pertaining to using limitations, such as a permitted using period or the number of times the use limited contents may be used, that is included in the licensing data for the use limited contents, and the current using state of the use limited contents are registered and stored in correlation with each other. This contents management database is updated, as needed.

The using state monitoring start determination unit 68 determines whether monitoring of the current using state of use limited contents stored in the storage unit 67 should be started, uses the determination results to generate an using state determination start instruction signal, and transmits this signal to the main controller 51.

Upon receiving an using state determination start signal from the main controller 51, the using state determination unit 69 begins the determination of the current using state of the use limited contents that are stored in the storage unit 67 and the limitations, designated in advance, that permit their using by a user, and transmits the results of the determination to the main controller 51.

Figure 5:
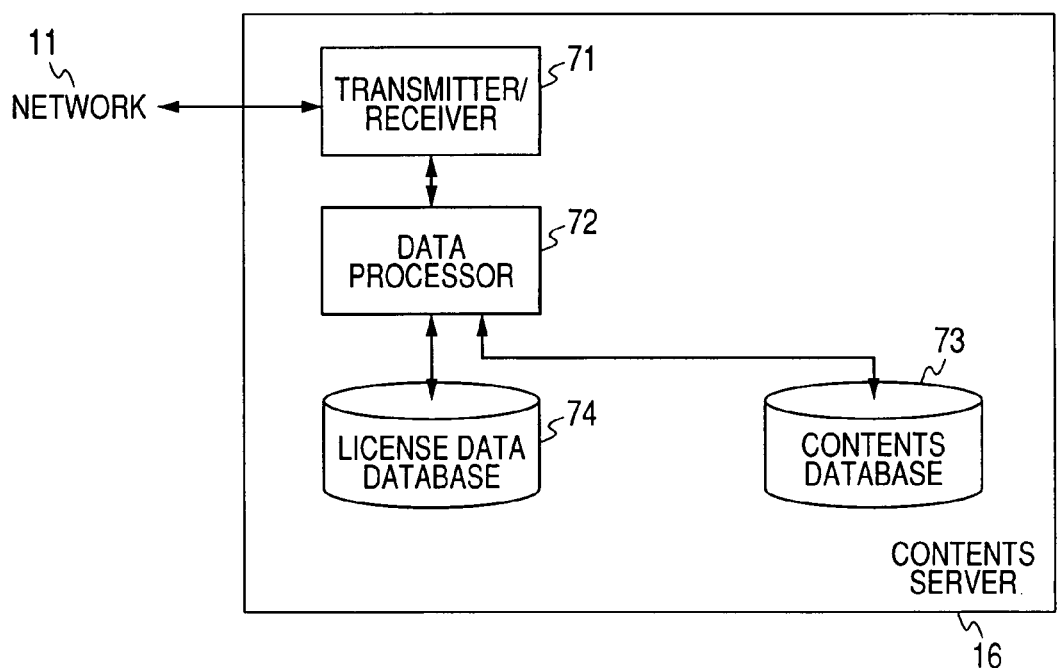
FIG. 5 is an exemplary block diagram showing the internal arrangement of a contents server shown in FIG. 1.

FIG. 5 is a diagram showing the arrangement of the contents server 16.

The contents server 16 includes a transceiver/receiver 71, a data processor 72, a contents database 73 and a license data database 74.

The transceiver/receiver 71 receives a license acquisition request signal from the camera-equipped digital mobile phone 15 via the network 11, and transmits this signal to the data processor 72. The data processor 72 analyzes the license acquisition request received from the license transceiver/receiver 71, which is based on the analysis results, reads corresponding license data from the license data database 74 and generates new license data. The data processor 72 transmits the new license data to the license data database 74 and to the transceiver/receiver 71.

In the contents database 73, the contents ID, and the name and the substance of the contents are registered and stored in advance in correlation with each other.

License data (data with which a management number, a user ID, a license ID, a contents ID, the name of contents and information about use limitations, for example, are correlated in advance) generated by the data processor 72 is registered in advance in the license data database 74. And based on an instruction received from the data processor 72, appropriate license data is supplied to the data processor 72.

The using state monitoring processing performed by the camera-equipped digital mobile phone 15 in FIG. 4 will now be described while referring to the flowchart in FIG. 6.

At step S1, the main controller 51 determines whether a user has manipulated the operation keys 36 and designated use limited contents in advance for wallpaper (wallpaper for a screen saver) or a ringtone. The main controller 51 delays the processing until it is determined that the user, by manipulating the operation keys 36, has set the use limited contents for using as wallpaper or as a ringtone.

When at step S1 the main controller 51 determines that the user, by manipulating an operation key 36, has set up the use limited contents for using as wallpaper or as a ringtone, at step S2, under the control of the main controller 51, the using state monitoring start determination unit 68 begins to determine whether monitoring of the current using state of the use limited contents should be started. And based on detection results obtained by the magnetic sensors 39a and 39d, the using state monitoring start determination unit 68 determines whether the closed state of the camera-equipped digital mobile phone 15 has been is changed to the open state.

Figure 7:
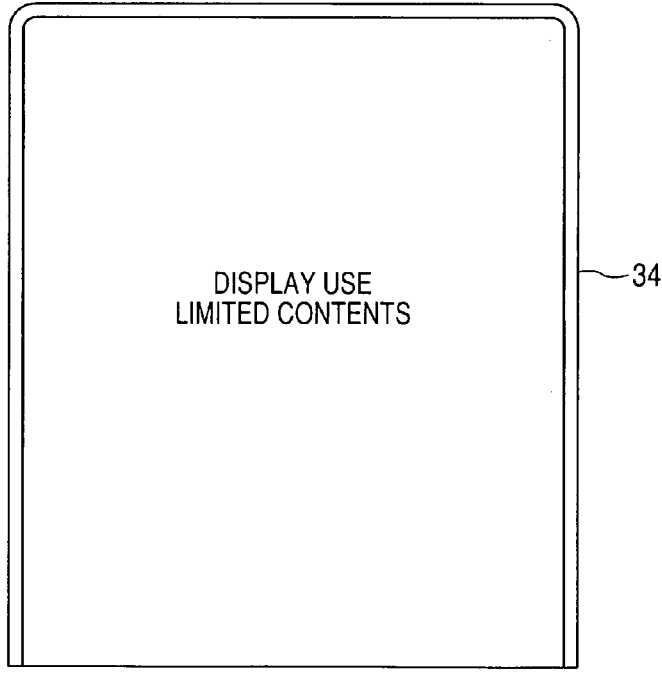
FIG. 7 is an exemplary diagram showing an example use limited contents display on a liquid crystal display panel in FIG. 4.

When, before the process at step S1 is performed, the user has manipulated an operation key 36 and for use limited contents has designated their use for wallpaper, as shown in FIG. 7, the use limited contents for which their using was designated in advance are displayed as wallpaper on the liquid crystal display 34. Further, when before the process at step S1 is performed the user has manipulated an operation key 36 and has designated that use limited contents be used as a ringtone, upon receiving a call from a camera-equipped digital mobile phone 15 owned by another user, the use limited contents designated in advance for using as a ringtone are read from the storage unit 67 and are used as a ringtone. Specifically, the audio codec 60 converts the use limited contents from a digital signal into an analog signal, and outputs the analog signal through the loudspeaker 35 as a ringtone.

When, at step S2, it is determined that the camera-equipped digital mobile phone 15 has been changed from the closed state to the open state, the using state monitoring start determination unit 68 generates an using state determination start instruction signal that it transmits to the main controller 51. At step S3, based on the using state determination start instruction signal received from the using state monitoring start determination unit 68, the main controller 51 generates an using state determination start signal to begin start determining the current using state of the use limited contents, and transmits this signal to the using state determination unit 69. Thereafter, the processing advances to step S4, and the using state determination process is performed. The detailed using state determination process is shown in the flowchart in FIG. 8.

Figure 8:
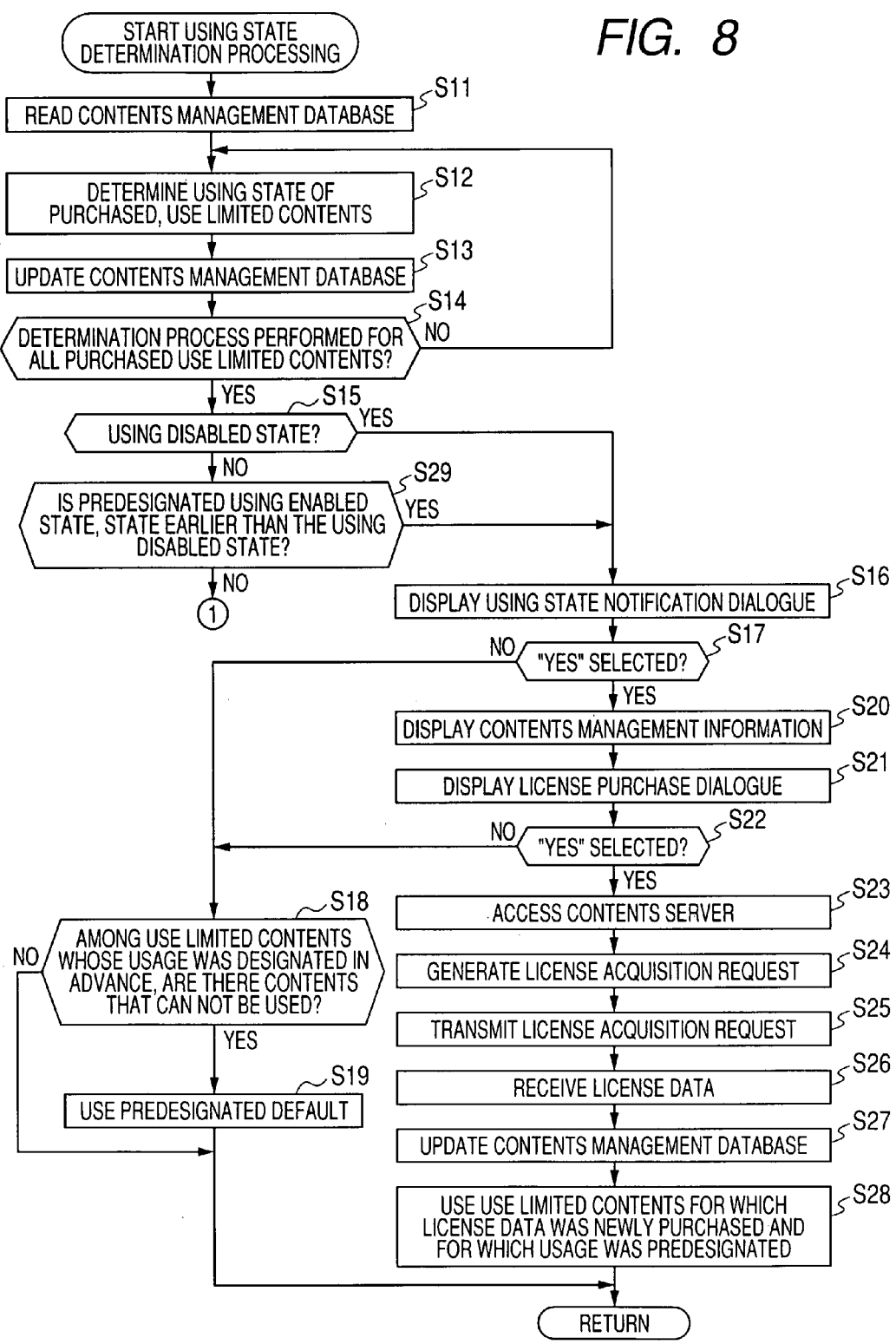
FIG. 8 is an exemplary detailed flowchart for explaining the using state determination process at step S4 in FIG. 6.

The using state determination processing performed by the camera-equipped digital mobile phone 15 in FIG. 4 will now be described in detail while referring to the flowchart in FIG. 8.

At step S11, the using state determination unit 69 uses the using state determination start signal, received from the main controller 51, to begin determining the current using state of the use limited contents. First, the using state determination unit 69 reads the current date and accurate time from the timer incorporated in the main controller 51 and the contents management database stored in the storage unit 67.

FIG. 9 is a diagram showing an example structure for the contents management database stored in the storage unit 67.

A "setup" field, a "contents name" field, an "using limitation information" field, an "available use count" field, an "using state" field and an "using state notification time" field are provided for the first to the sixth columns of the contents management database in FIG. 9. Registered in the individual fields are a setup (use) for using use limited contents for the camera-equipped digital mobile phone 15, the name of use limited contents for which a user obtained using rights from the contents server 16 of a contents provider, information concerning using limitations included in the license data for the use limited contents, the number of times remaining that the contents may be used, the using state of the use limited contents, as determined by the latest using state determination process, and a time, designated in advance by a user, for receiving notification of the using state of the use limited contents.

In the first row in FIG. 9, "wallpaper" is registered in the "setup" field; this indicates that "wallpaper" is the setup (use) for the using of the use limited contents for the camera-equipped digital mobile phone 15. "Contents A" is registered in the "contents name" field; this indicates that "contents A" is the name of the use limited contents for which a user purchased using rights from the contents server 16 of a contents provider. "February 28 18:00", for example, is registered in the "use limitation information"; this indicates that "February 28 18:00" is information concerning an using limitation included in license data for use limited contents, i.e., the use limited contents can be used until 18:00, February 28. "/" is registered in the "available use count" field; this indicates that since the pertinent contents are not contents that can be used only a limited number of times, no definitive entry need be entered. "Using enabled state" is registered in the "using state" field. This indicates that during the latest using state determination process, the "using enabled state" was determined to be the using state of the use limited contents, i.e., during the latest using state determination process, the current state was determined to be the using enabled state, which indicates that the use limited contents can be used. "February 26 18:00", for example, is registered in the "using state notification time". This indicates that "February 26 18:00" is the time that was designated in advance by a user to receive notification of the using state of the use limited contents.

Referring to the first row in FIG. 9, "February 26 18:00" is entered as the "using state notification time", and "February 28 18:00" is the using limitation information for use limited contents A. This indicates that the user has designated a time two days prior to the expiration of a permitted using time to receive a notification from the using state for the use limited contents A. Of course, the user can designate an arbitrary using state notification time, and can set, for example, two days, 24 hours or 18 hours prior to the expiration of a permitted using time as the time to receive the using state notification for the use limited contents. Further, a date and a time, such as "February 26 20:00", can also be designated and used for a notification.

In the second row in FIG. 9, "ringtone" is registered in the "setup" field; this indicates that "ringtone" is the setup (use) for using the use limited contents for the camera-equipped digital mobile phone 15. "Contents B" is registered in the "contents name" field; this indicates that "contents B" is the name of use limited contents that a user purchased from the contents server 16 of a contents provider. "March 5 03:30", for example, is registered in the "use limitation information"; this indicates that "March 5 03:30" is information related to an using limitation included in license data for use limited contents, i.e., the use limited contents can be used until 03:30, March 5. "/" is registered in the "available use count" field; this indicates that since the pertinent contents are not contents for which the times they may be used is not limited, the number of times they may yet be used is not entered. "Using enabled state" is registered in the "using state" field. This indicates that during the latest using state determination process "using enabled state" was determined to be the using state of the use limited contents, i.e., in the latest using state determination process, the current state was determined to be the using enabled state, indicating that the use limited contents can be used. "March 3 09:00", for example, is registered in the "using state notification time". This indicates that "March 3 09:00" is a time that was designated in advance by a user to receive a notification of the using state of the use limited contents.

Referring to the second row in FIG. 9, "March 3 09:00" is entered in the "using state notification time", and "March 5 03:30" is the using limitation information for contents B. This indicates that the user has designated one day and 18 hours and 30 minutes before the expiration of an using limit to receive notification of the using state of the contents B.

In the third row in FIG. 9, "nonapplicable" is registered in the "setup" field; this indicates that the setup (use) for the using of use limited contents for the camera-equipped digital mobile phone 15 is "nonapplicable", i.e., a setup (use) for the using of the use limited contents is not performed for the camera-equipped digital mobile phone 15. "Contents C" is registered in the "contents name" field; this indicates that "contents C" is the name of the use limited contents for which a user purchased using rights from the contents server 16 of a contents provider. "10 times", for example, is registered in the "use limitation information"; this indicates that "10 times" is information related to a use limitation included in licensing data for the use of limited contents, i.e., the use limited contents can be used only ten times. "3" is registered in the "available use count" field; this indicates that "3" is the number of using times remaining for the contents for which the using times are limited. "Using enabled state" is registered in the "using state" field. This indicates that during the latest using state determination process, the "using enabled state" was determined to be the using state of the use limited contents, i.e., during the latest using state determination process, the current state was determined to be the using enabled state, which indicated that the use limited contents could be used. "2", for example, is registered in the "using state notification time". This indicates that "2" is an using count that the user has designated in advance for the reception of the using state of the use limited contents. That is, the user has made an advance designation for the reception, when the remaining count for the using of the use limited contents reaches "2", of the then current using state of the use limited contents.

Referring to the third row in FIG. 9, since "2" is entered in the "using state notification time", and "10 times" is the use limitation information for contents C, this indicates that the user has designated that a notification be received when the using state of the contents C is the using enabled state for which "2" is the remaining number of times.

Since the same thing is applied for the fourth and fifth rows of the contents management database in FIG. 9, no further explanation for them will be given.

At step S12, the using state determination unit 69 refers to the current date, the accurate time and the contents management database to determine the using state for the use limited contents for which using rights have been is purchased.

Specifically, assume that the current date and the accurate time are, for example, March 1, 14:16. In the example in the first row in FIG. 9, since "February 28, 18:00" is information related to an using limitation entered in the "use limitation information", it is determined that the current using state is an using disabled state indicating that the use limited contents can no longer be used.

In the example in the second row in FIG. 9, since "March 5, 03:30" is information related to an using limitation entered in "using use limitation information", it is determined that the current using state is an using enabled state indicating that the use limited contents can be used.

The using state determination unit 69 transmits the obtained results to the main controller 51.

At step S13, based on the determination results received from the using state determination unit 69, the main controller 51 permits the storage unit 67 to update the contents management database that is stored in the storage unit 67. Then, under the control of the main controller 51, the storage unit 67 updates the contents management database.

When the current date and the accurate time are, for example March 1, 14:16, it is determined that the current using state for the first row in FIG. 9 is the using disabled state, indicating that the use limited contents can no longer be used. Thus, the contents of the management database stored in the storage unit 67 are updated as shown in FIG. 10. In the contents management database in FIG. 10, the "using enabled state" entered in the "using state" field in the first row in the contents management database in FIG. 9 is updated to "using disabled state".

At step S14, the using state determination unit 69 determines whether the determination process has been completed for all the use limited contents for which permission to use was purchased.

When the using state determination unit 69 determines at step S14 that the determination process has not yet been completed for all the use limited contents that were purchased, the processing is returned to step S12, and the subsequent processing, at step S12, is repeated. Through this processing, the current using states of all the use limited contents stored in the storage unit 67 can be obtained.

When the using state determination unit 69 determines at step S14 that the determination process has been completed for all the use limited contents for which use permission was purchased, at step S15, the using state determination unit 69 reads the updated contents management database from the storage unit 67, and examines the updated contents management database to determine whether the current using state of the use limited contents, whose usage (e.g., as wallpaper or as a ringtone) has been designated in advance by the user, is the using disabled state indicating that the use limited contents can no longer be used.

Specifically, while referring to the example shown in FIG. 10, the using state of the use limited contents (contents B) designated for a ringtone is not the "using disabled state", i.e., is "using enabled state"), and the using state of at least one of the contents (contents A), whose usage has been designated in advance, is "using disabled state". Therefore, it is determined that the current using state of the use limited contents, whose usage has been designated in advance by the user, is the using disabled state, indicating that the use limited contents can no longer be used.

When it is determined at step S15 that the current using state of the use limited contents, whose usage has been designated in advance by the user, is the using disabled state, indicating that the use limited contents can no longer be used, the using state determination unit 69 transmits the determination results to the main controller 51. At step S16, based on the determination results received from the using state determination unit 69, the main controller 51 permits the LCD controller 56 to display on the liquid display panel 34 an using state notification dialogue 81 shown in FIG. 11.

Figures 11, 12:
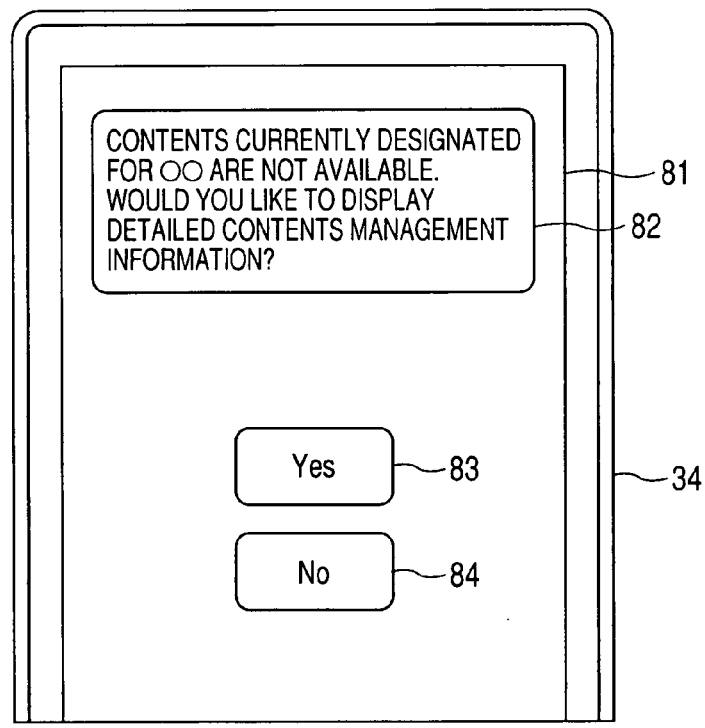
FIG. 11 is an exemplary diagram showing an example using state notification dialogue displayed on the liquid crystal display panel in FIG. 4.
FIG. 12 is an exemplary diagram showing an example contents management table displayed on the liquid crystal display panel in FIG. 4.

The using state notification dialogue 81 in FIG. 11 includes a message display field 82 and command display fields 83 and 84 for displaying commands.

In the example shown in FIG. 11, the message "You can't use currently designated contents OO. Would you like to display detailed contents management information?" is displayed on the message display field 82. Upon viewing this message, a user understands that use limited contents designated for wallpaper or a ringtone can no longer be used, and that detailed contents management information can be displayed using the succeeding process.

Icons for commands "Yes" and "No" are displayed in the command display fields 83 and 84. By manipulating an operation key 36, the user can select the "Yes" command icon in the command display field 83 for instructing the start of a process for the display of detailed contents management information. By further manipulating an operation key 36, the user can select the icon for the "No" command in the command display field 84 to cancel the process for the display of detailed contents management information.

At this time, information such as the using state notification dialogue 81 in FIG. 11 (that includes an alert sound that will be described later), which is transmitted to (provided for) a user and is related to the using state of use limited contents purchased from the contents server 16 of a contents provider, is defined as "an information associated state of use".

At step S17, the main controller 51 determines, in response to the using state notification dialogue 81 in FIG. 11, whether the user has selected the "Yes" icon in the command display field 83, by manipulating the operation key 36, and has entered an instruction for the display of detailed contents management information.

When, at step S17, the user has selected the "Yes" icon in the command display field 83 by manipulating an operation key 36, the main controller 51 assumes that an instruction has been entered by the user to display detailed contents management information by manipulating the operation key 36 and selecting the "Yes" icon in the command display field 83.

When, at step S17, the user has selected the "No" icon in the command display field 84 by manipulating the operation key 36, the main controller 51 assumes that an instruction to display the detailed contents management information has not been entered by the user by manipulating the operation key 36 and selecting the "Yes" icon in the command display field 83.

When it is ascertained at step S17 that the user has not manipulated an operation key 36 and selected the "Yes" icon in the command display field 83 for the entry of an instruction to display the detailed contents management information, at step S18, the main controller 51 examines the updated contents management database and determines whether, of the use limited contents whose usage (wallpaper or a ringtone) has been designated in advance, there are contents that can no longer be used.

Specifically, referring to the example in FIG. 10, the using state of use limited contents (contents B) designated to be used for a ringtone is not the "using disabled state", i.e., is the "using enabled state", and the using state of the use limited contents (contents A) designated for wallpaper is the "using disabled state". Thus, as the current using state, it is determined that, of the limited contents whose usages (as wallpaper or a ringtone) have been designated in advance by the user, there are contents that can no longer be used.

When it is determined at step S18 that, of the use limited contents whose usages (as wallpaper or a ringtone) have been designated in advance by the user, there are contents that can no longer be used, at step S19, the main controller 51 reads a default setup stored in the storage unit 67, and uses the default setup. Specifically, when use limited contents, whose usages have been designated in advance and are no longer enabled, are the contents that are designated for wallpaper, the main controller 51 reads from the storage unit 67 default wallpaper data, for which there is no use limitation, that has been designated for display as wallpaper on the liquid crystal display panel 34 of the camera-equipped digital mobile phone 15, and permits the LCD controller 56 to display this default wallpaper on the liquid crystal display panel 34.

Further, when use limited contents whose usages are designated in advance and are no longer enabled are the contents designated for a ringtone, the main controller 51 sets a ringtone, based on default ringtone data (an audio signal) for which no use limitation is stored in the storage unit 67 and is to be used as the ringtone for the camera-equipped digital mobile phone 15. Thus, when a call arrives from a camera-equipped digital mobile phone 15 of another user, a default ringtone for which there is no use limitation is generated.

As a result, when the user can no longer use limited contents, and does not desire to repeat the using of the use limited contents, default wallpaper for which there is no use limitation, for example, can be displayed on the liquid crystal display panel 34 of the camera-equipped digital mobile phone 15. Therefore, the using of use limited contents, when managed based on license information, can be improved.

When it is determined at step S18 that of the use limited contents whose usage (as wallpaper or a ringtone) is designated in advance, there are none whose using is disabled, the process at step S19 is skipped, and the using state determination processing is terminated. Program control thereafter returns to step S1 in FIG. 6, and the processes following step S1 are repeated.

When it is determined at step S17 that the user has selected the "Yes" icon in the command display field 83 by manipulating an operation key 36, at S20, the main controller 51 reads the updated contents management database from the storage unit 67 and permits the LCD controller 56 to refer to the contents management database, which is read, and display a contents management table 84 on the liquid crystal display panel 34 as shown in FIG. 12.

FIG. 12 is a diagram showing an example for the contents management table 84 to be displayed on the liquid crystal display panel 34 in FIG. 4. Since "setup" and "contents name" in the first and the second columns in FIG. 12 have the same entries as in "setup" and "contents name" in the first and second columns in the contents management database in FIG. 9, no further explanation for them will be given.

In the third column in FIG. 12, "current using state" is entered, indicating the current using state of use limited contents.

Referring to the first row in FIG. 12, "wallpaper" is entered as "setup"; this indicates that "wallpaper" is the setup (usage) for using use limited contents in the camera-equipped digital mobile phone 15. "Contents A" is entered as "contents name"; this indicates that "contents A" is the name of use limited contents for which a user has purchased using permission from the contents server 16 of a contents provider. "Using disabled state" is entered as "current using state"; this indicates that "using disabled state" is the current using state of use limited contents, i.e., the using of use limited contents is disabled.

Referring to the second row in FIG. 12, "ringtone" is entered as "setup"; this indicates that "ringtone" is the setup (usage) for using use limited contents in the camera-equipped digital mobile phone 15. "Contents B" is entered as "contents name"; this indicates that "contents B" is the name of use limited contents for which a user purchased use rights from the contents server 16 of a contents provider. "Using enabled state" is entered as "current using state"; this indicates that "using enabled state" is the current using state of use limited contents, and the use limited contents are available until 3:30, March 5.

Since the same arrangement is applied for the third to the fifth rows of the contents management table 84 in FIG. 12, no further explanation for them will be given.

For the camera-equipped digital motile phone 15 of this embodiment, since the current using state of the use limited contents stored in the storage unit 67 is displayed, the user can obtain the current using state of the use limited contents.

Therefore, since the user can easily understand the current using state of use limited contents that are is purchased, utilization of the use limited contents managed based on license information can be improved.

Referring again to FIG. 8, when the user has manipulated the operation keys 36 and moved a cursor (not shown) to the position of a row on the display screen of the liquid crystal display panel 34, e.g., the first row in FIG. 12 (row wherein "wallpaper", "contents A" and "using disabled state" are displayed), the row enters a focusing state. Further, when the user has depressed the operation keys 36 on the second case 33 (has clicked on), at step S21, the main controller 51 permits the LCD controller 56 to display a license purchase dialogue 85, shown in FIG. 13A or 13B, on the liquid crystal display panel 34.

Figure 13A:
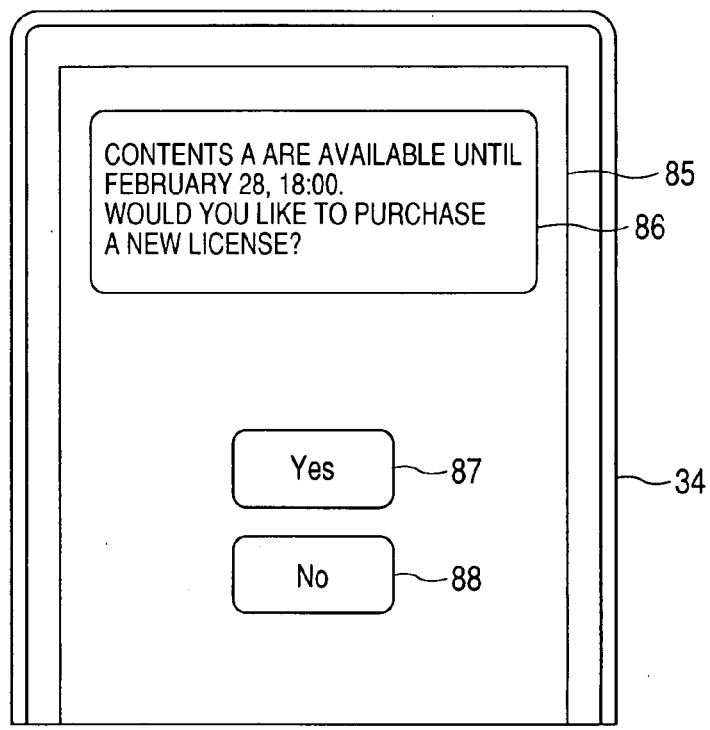
FIGS. 13A and 13B are diagrams showing example license purchase dialogues displayed on the liquid crystal display panel in FIG. 4.
Figure 13B:
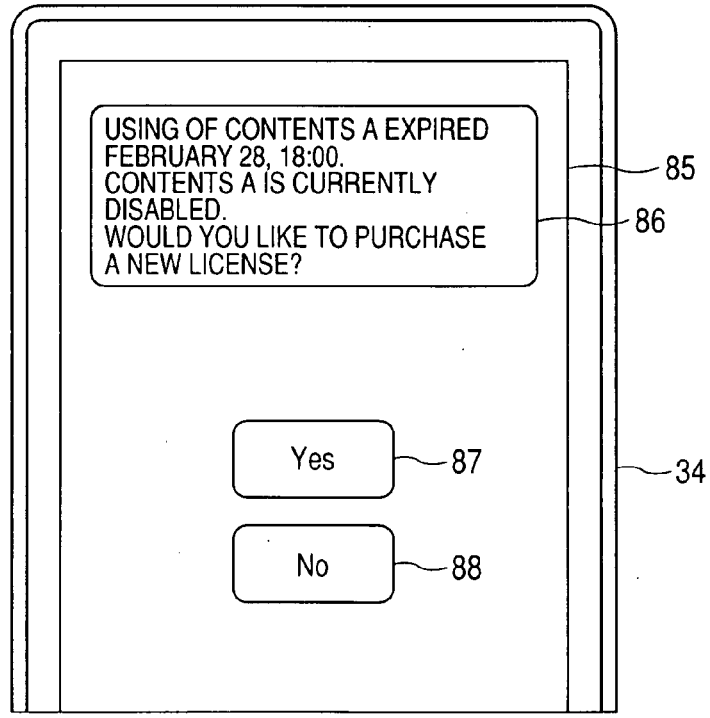

The license purchase dialogue 85 shown in FIG. 13A or 13B includes a message display field 86 and command display fields 87 and 88 for displaying commands.

In the example shown in FIG. 13A or 13B, the message "Use of contents A is enabled until 18:00, February 28. The remaining available use period is getting short. Would you like to purchase a new license?", or the message "The use period for contents A expired at 18:00, February 28. Use of contents A is currently disabled. Would you like to purchase a new license?" is displayed in the message display field 86. By reading this message, a user can obtain using limitation information (information related to using is available) for use limited contents for which a license was purchased by the user, and when the remaining using available period is short, or when the use, limited contents can no longer be used, a request can be issued for the purchase of a new license for the pertinent contents, or for other use limited contents. As a result, the user can obtain use limitation information for use limited contents for which the user purchased a license, and can apprehend that by performing the succeeding process, he or she can purchase a new license for the use limited contents for which the using license has expired. Therefore, the using of use limited contents that are managed based on licensing information can be improved.

"Yes" and "No" command icons are included in the command display fields 87 and 88. To cancel the license purchasing process, the user selects the "No" command icon in the command display field 88 by manipulating an operation key 36. While for instructing the start of the license purchase process, the user selects the "Yes" command icon in the command display field 87 by manipulating an operation key 36.

Figures 14, 15:
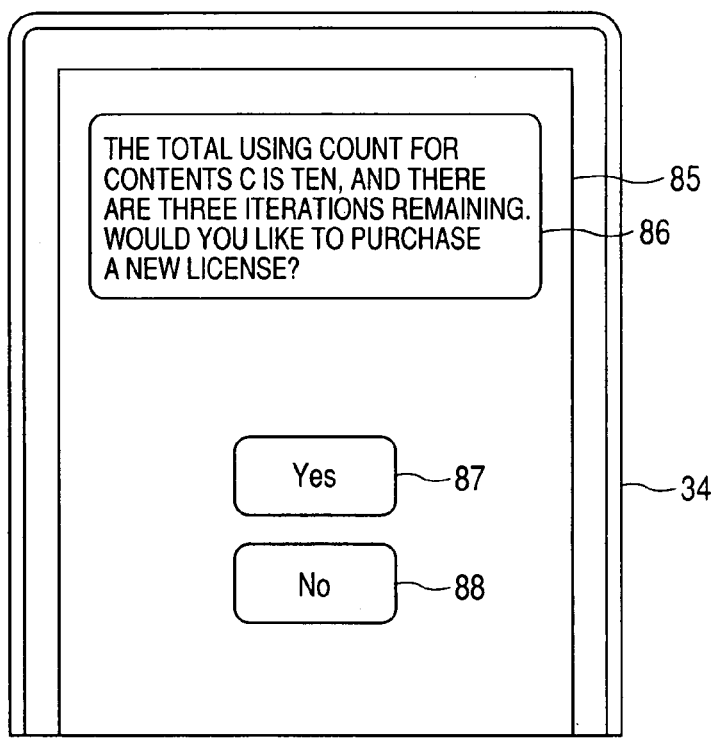
FIG. 14 is an exemplary diagram showing another example license purchase dialogue displayed on the liquid crystal display panel in FIG. 4.
FIG. 15 is an exemplary diagram showing an example structure for a license data acquisition request generated by a main controller in FIG. 4.

When the user has manipulated an operation key 36 and has moved the cursor (not shown) to a row on the display screen of the liquid crystal display panel 34, e.g., the third row in FIG. 12 (the row wherein "nonapplicable", "contents C" and "using enabled state (three more iterations)?" are displayed), and when the user has depressed an operation key 36 on the second case 33 (clicked on), the main controller 51 permits the LCD controller 56 to display a license purchase dialogue 85 shown in FIG. 14 on the liquid display panel 34.

In the example shown in FIG. 14, message, "The total using count for contents C is ten; there are three iterations remaining. Would you like to purchase a new license?" is displayed in a message display field 86. With this message, the user can be notified of using limitation information for use limited contents that the user purchased, and a request can be issued to purchase a new license for the pertinent use limited contents, or for other use limited contents. As a result, the user understands that by performing a succeeding process, a new license for use limited contents can be purchased, so that the use of contents C can be extended. Thus, the using of use limited contents, managed based on licensing information, can be improved.

At step S22, the main controller 51 determines, based on the license purchase dialogue 85 in FIG. 13, whether the user has manipulated the operation key 36 and has selected the "Yes" command icon, in the command display field 87, to enter an instruction for purchasing a new license.

When the user has manipulated the operation key 36 and has selected the "Yes" icon in the command display field 87, the main controller 51 ascertains at step S22 that an instruction for purchasing a new license has been entered by the user by manipulating the operation key 36 and selecting the "Yes" icon in the command display field 83.

When the user has manipulated the operation key 36 and selected the "No" icon in the command display field 88, the main controller 51 ascertains at step S22 that an instruction for purchasing a new license has not been entered by the user by manipulating the operation key 36 and selecting the "Yes" icon in the command display field 83.

When, however, the main controller 51 determines, at step S22, that the user did not select the "Yes" command icon in the command display field 87, by manipulating the operation key 36, and enter an instruction to purchase a new license, program control is shifted to step S18 and the processing following step S18 is repeated. Specifically, when there are contents whose usage is designated in advance and which can no longer be used, the default setup stored in the storage unit 67 is read and is used.

With this arrangement, when using of use limited contents is disabled, and when the user does not desire to continuously use the pertinent use limited contents by purchasing a new license, the user can display a default wallpaper, having no use limitation, on the liquid crystal display panel 34 of the camera-equipped digital mobile phone 15, without purchasing a new license. Therefore, the using of use limited contents, managed based on licensing information, can be improved.

When the main controller 51 determines, at step S22, that the user has selected the "Yes" command icon, in the command display field 87, by manipulating the operation key 36, and has entered an instruction for the purchase of a new license, at step S23, the main controller 51 permits the modulation/demodulation circuit 59 to connect to the contents server 16 via the network 11.

Thereafter, the camera-equipped digital mobile phone 15 is connected to the contents server 16 via the network 11, and a homepage managed by the contents server 16 is displayed on the liquid crystal display panel 34 of the camera-equipped display mobile phone 15. Then, the user performs an operation, on the homepage of the contents server 16, displayed on the liquid crystal display panel 34, to purchase a new license for the use limited contents that can no longer be used.

Specifically, when use limitation information included in licensing information for the use limited contents is a use limited period, the user performs an operation for determining an using limited period (e.g., ten days) included in the new license information that is purchased.

At step S24, the main controller 51 reads licensing data for the use limited contents stored in the storage unit 67, and generates a license acquisition request 91, shown in FIG. 15, by using the licensing data and data entered by the user using the operation keys 36.

"User ID", "license ID", "contents ID", "contents name" and "acquisition request use information" are entered in the first to the fourth columns of the license acquisition request 91 in FIG. 15.

"User ID" is the identification number of a user of the contents server 16, and is provided for the user, by the contents server 16 of a contents provider, when the user purchases licensing data for new use limited contents, or for use limited contents that the user had previously been purchased. The user ID is included in the licensing data stored in the storage unit 67.

"License ID" is the identification number for a license provided for licensing data for use limited contents, and is provided by the contents server 16 of a contents provider when the user purchases use limited contents. The license ID is included in license data stored in the storage unit 67.

"Contents ID" is the identification number for use limited contents used by the contents server 16, and is provided by the contents server 16, of a contents provider, when the user purchases use limited contents. The contents ID is included in licensing data stored in the storage unit 67.

"Contents name" is the name of use limited contents to be sold by the contents server 16. The contents name indicates the name of the use limited contents the user purchased from the contents server 16 of the contents provider, and is included in licensing data stored in the storage unit 67.

"Acquisition request use information" is using information related to use limited contents that the user, by manipulating the operation key 36, ordered on the home page of the contents server 16 of the contents provider displayed on the liquid crystal display panel 34.

Referring to the example in FIG. 15, "000011" is "user ID"; this indicates that "0.00011" is the identification number of a user of the contents server 16. "112000" is the "license ID"; this indicates that "112000" is the identification number of a license that is provided for licensing data for use limited contents. "000125" is "contents ID"; this indicates that "000125" is the identification number of the use limited contents for the contents server 16. "Ten days" is "acquisition request use information". This indicates that "ten days" is the period of using for the use limited contents that the user ordered, on the homepage of the contents server 16 of a contents provider displayed on the liquid display panel 34, by manipulating the operation key 36.

At step S25, the main controller 51 transmits the generated license acquisition request to the modulation/demodulation circuit 59. The modulation/demodulation circuit 59 performs a spectrum spreading modulation for the license acquisition request received from the main controller 51, and transmits the resultant order to the transmission/reception circuit 63. The transmission/reception circuit 63 performs a digital/analog conversion and frequency conversion for the license acquisition request received from the modulation/demodulation circuit 59, and transmits the resultant request to the contents server 16 through the antenna 64.

At step S26, the transmission/reception circuit 63 of the camera-equipped digital mobile phone 15 receives new licensing data from the contents server 16 via the network 11, and transmits the new licensing data to the modulation/demodulation circuit 59. The modulation/demodulation circuit 59 performs a spectrum despreading demodulation for the new licensing data received from the transmission/reception circuit 63, and transmits the obtained licensing data to the storage unit 67.

At step S27, the storage unit 67 receives the new licensing data from the modulation/demodulation circuit 59, and uses the new licensing data to update the contents management database, for example, as shown in FIG. 16.

Referring to the contents management database shown in FIG. 16, for example, an entry, "February 28 18:00", in a "use limitation information" field in the first row of the contents management database in FIG. 10, is updated to "March 11 14:30"; an entry, "using disabled state", in an "using state" field in the first row, is updated to "using enabled state"; and an entry, "February 26 18:00", in an "using state notification time" field in the first row, is updated to "March 9 14:33".

At step S28, the main controller 51 reads from the storage unit 67, use limited contents for which a license was newly purchased and for which a usage (e.g., wallpaper or a ringtone) has been designated in advance, and uses the use limited contents. Specifically, when use limited contents for which a license was newly purchased are designated in advance for wallpaper, the pertinent use limited contents are displayed as wallpaper on the liquid crystal display panel 34. Further, when use limited contents, for which a license was newly purchased, are designated for using as a ringtone, at the time an incoming call is received from another camera-equipped digital mobile phone 15, the pertinent use limited contents are read from the storage unit 67 and are used as a ringtone.

With this arrangement, when specific use limited contents can no longer be used, and when the user desires to again use the specific use limited contents, the user need only purchase a new license for those specific use limited contents, so that the specific use limited contents can be displayed, as wallpaper, for example, on the liquid crystal display panel 34. Therefore, using of use limited contents, managed based on licensing information, can be improved.

When it is determined at step S15 that the current using state of the use limited contents, whose usage is designated in advance by the user, is not in an using disabled state, which indicates the use limited contents can not be used (i.e., the current using state of the pertinent use limited contents is an using enabled state indicating the use limited contents can be used), at step S29, the using state determination unit 69 examines current data and an accurate time that have been read, and the updated contents of the management database, and determines whether the current using state of the use limited contents, for which the usage was designated in advance by the user, is a predesignated using enabled state, which is a state encountered earlier than the using disabled state wherein the use limited contents can not be used, i.e., either the current using time or the number of times the use limited contents are currently to be used exceeds the originally declared using time or number of times the use limited contents were to be used.

Assume, for example, that a contents management database shown in FIG. 17 is obtained by an updating procedure performed by the processes at steps S11 to S14, and that "March 1 14:16", for example, is the current date and the accurate time. In this case, "March 3 9:00" is entered as a use notification time in the "using state notification time" field for the use limited contents (contents B) that are designated, for the provision of a ringtone, in the second row in FIG. 17, while "March 1 14:05" is entered in the "use notification time" field for use limited contents (contents A), in the first row in FIG. 17, that are designated for use for wallpaper. Therefore, it is determined that the current using state of use limited contents, whose usage is designated in advance by the user, is a predesignated using enabled state, which is encountered earlier than the using disabled state, which indicates the use limited contents can not be used.

When it is determined at step S29 that the current using state is the predesignated using enabled state, which is encountered earlier than the using disabled state, which indicates the use limited contents can not be used, program control is shifted to step S16 and the processing following step S16 is repeated. In this case, during the process at step S16, an using state notification dialogue 81 shown in FIG. 18 is displayed.

Figure 18:
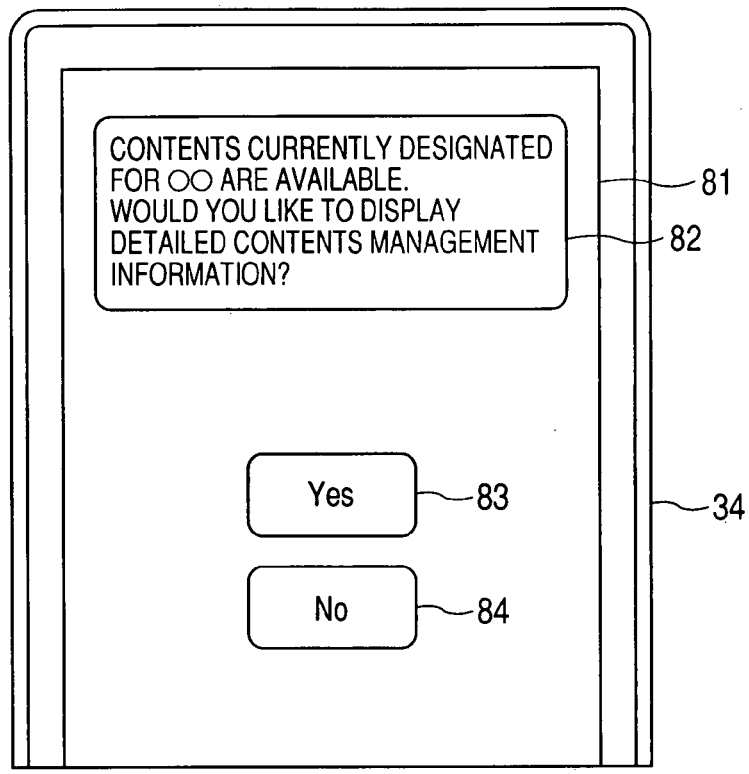
FIG. 18 is an exemplary diagram showing another example using state notification dialogue displayed on the liquid crystal display panel in FIG. 4.

While referring to the example in FIG. 18, the message, "Contents currently designated for OO can be used. Would you like detailed contents management information to be displayed?", is displayed in a message display field 82. Thus, the user is notified that by performing the succeeding process the detailed contents management information can be displayed.

With this arrangement, before the using of the use limited contents that were purchased is disabled, the current using state of the use limited contents can be provided for the user. As a result, since the user can obtain the current using state of the previously purchased use limited contents before their using is disabled, the user can either purchase a new license and extend the using period or increase the number of times the use limited contents will be available for using, or can consider the purchase of other use limited contents. Therefore, the using of use limited contents, managed based on licensing information, can be improved.

Figure 6:
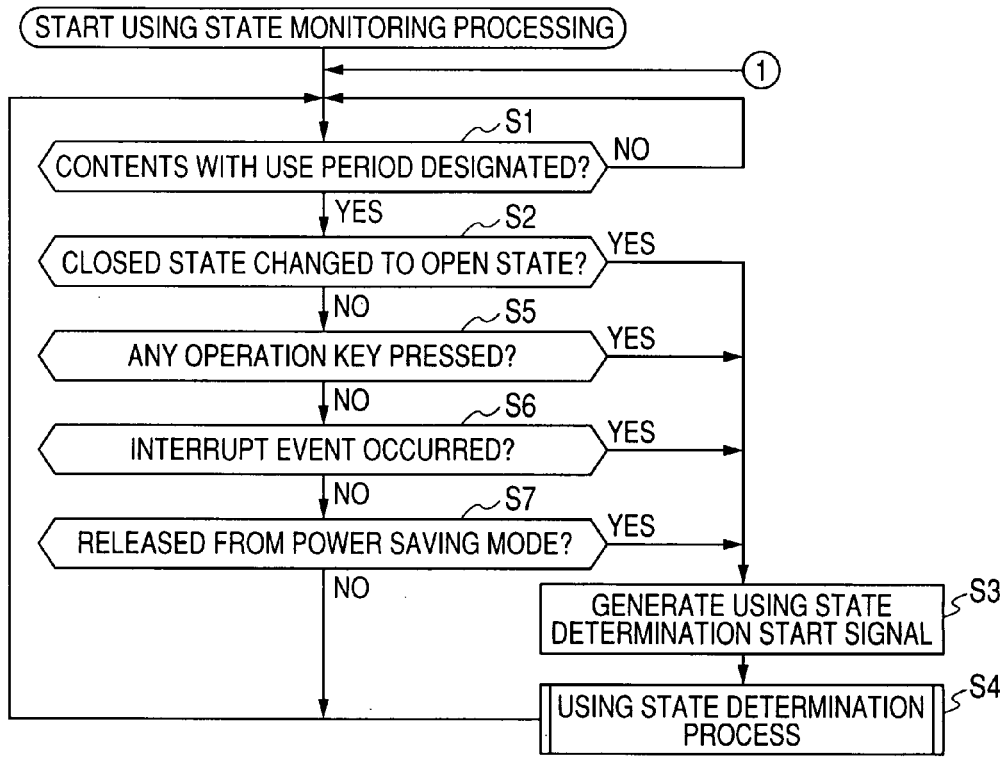
FIG. 6 is an exemplary flowchart for explaining the user state monitoring processing performed by the camera-equipped digital mobile phone in FIG. 4.

When it is determined at step S29 that the current using state is not the predesignated using enabled state that is earlier than the using disabled state indicating the use limited contents can not be used, i.e., it is determined that the current using state is earlier than the predesignated using enabled state that is earlier than the using disabled state indicating the use limited contents can not be used, program control returns to step S1 in FIG. 6, and the processes following step S2 is repeated.

Referring again to FIG. 6, when it is determined at step S2 that the state of the camera-equipped digital mobile phone 15 is not changed from the closed state to the open state, at step S5, the using state monitoring start determination unit 68 determines whether the user has pressed one of the operation keys 36.

When it is determined at step S5 that the user has pressed one of the operation keys 36, program control is shifted to step S3, and the processing following step S3 is performed. That is, the main controller 51 generates an using state determination start signal, and the using state determination processing is initiated.

When it is determined at step S5 that the user does not press any operation keys 36, at step S6, the using state monitoring start determination unit 68 determines whether an interrupt event, such as an incoming call from another camera-equipped digital mobile phone 15 or an alarm predesignated by a user, has occurred.

When it is determined at step S6 that an interrupt event has occurred, program control is shifted to step S3, and the processing following step S3 is performed. That is, the main controller 51 generates an using state determination start signal, and the using state determination processing is initiated.

When it is determined at step S6 that an interrupt event has not occurred, at step S7, the using state monitoring start determination unit 68 determines whether, for the camera-equipped digital mobile phone 15, the power saving mode (the power-OFF state of the liquid crystal display panel 34) has been terminated, i.e., determines whether the mode of the liquid crystal display panel 34 has changed from the power saving mode, during which the power is OFF, to the power ON mode.

When it is determined at step S7 that the mode of the camera-equipped digital mobile phone 15 has changed from the power saving to the power ON mode, program control is shifted to step S3 and the processing following S3 is performed. That is, the main controller 51 generates an using state determination start signal, and the using state determination processing is initiated.

When it is determined at step S7 that the camera-equipped digital mobile phone 15 has not been released from the power saving mode, program control returns to step S1, and the processing following step S1 is repeated.

For the camera-equipped digital mobile phone 15 of this embodiment, before the using state determination process at step S4 in FIG. 6, the using state monitoring start determination process is performed at steps S2 and S5 to S7 to determine whether the situation is appropriate, in order to notify the user of the current using state of the use limited contents that were purchased. Therefore, the current using state of use limited contents that were purchased can be transmitted to the user accurately, at an appropriate timing, and the power required to perform the using state determination process can be reduced.

Figure 19:
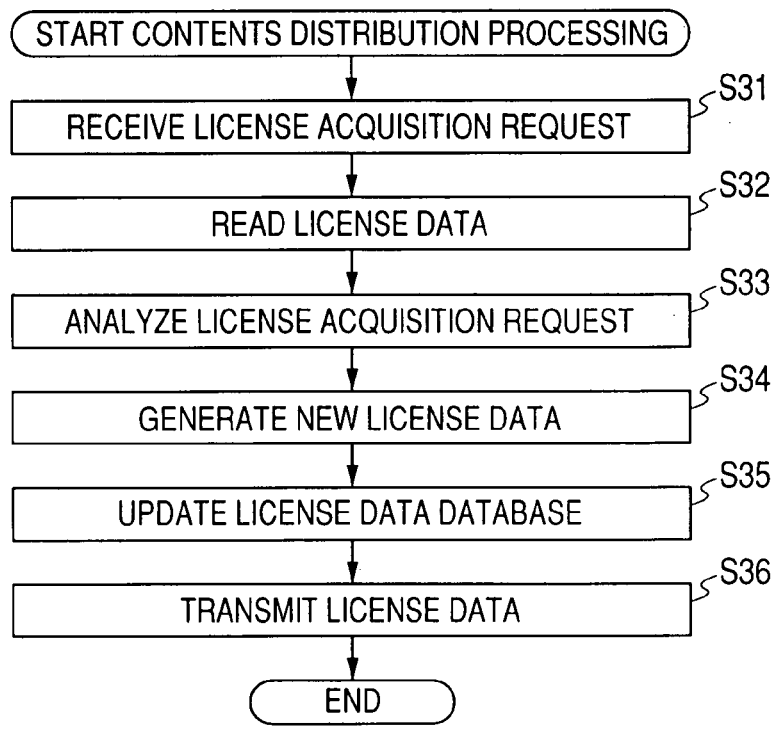
FIG. 19 is an exemplary flowchart for explaining the contents distribution processing performed by the contents server in FIG. 5.

The license data distribution processing performed by the contents server 16 in response to the license acquisition request transmission processing at step S25 in FIG. 8 will now be described while referring to the flowchart in FIG. 19.

At step S31, the transmitter/receiver 71 receives the license acquisition request 91 from the camera-equipped digital mobile phone 15 via the network 11, and transmits the license acquisition request 91 to the data processor 72. At step S32, the data processor 72 reads licensing data managed in the license data database 74.

FIG. 20 is a diagram showing the structure used for the storage of license data in the license data database 74. The same data as in the first to third columns, "user ID", "license ID" and "contents ID", for the license acquisition request 91 in FIG. 15, and in the second and third columns, "contents name" and "use limitation information", of the contents management database in FIG. 9 are entered in the second and fourth to seventh columns, "user ID", "license ID", "contents ID", "contents name" and "use limitation information", shown in FIG. 20. Thus, no further explanation will be given for them.

"Management number" and "user name" fields are provided for the first and third columns in FIG. 20. A management number, used by the contents server 16, and the name of the user who purchased use limited contents from the contents server 16 of a contents provider are entered in these fields.

While referring to the first row in FIG. 20, "0001" is entered in the "management number" field; this indicates "0001" is the management number used by the contents server 16. "000005" is entered in the "user ID" field; this indicates "000005" is the identification number of a user of the contents server 16. "Taro Aoki" is entered in the "user name" field, and this indicates that "Taro Aoki" is the name of the user who purchased use limited contents from the contents server 16 of a contents provider. "000138" and "000098" are entered in the "license ID" field; this indicates that "000138" and "000098" are identification numbers of licenses, provided for licensing data, for use limited contents. "000038" and "000101" are entered in the "contents ID" field; this indicates that "000038" and "000101" are identification numbers for use limited contents at the contents server 16. "Contents A" and "contents P" are entered in the "contents name" field; this indicates that "contents A" and "contents P" are the names of use limited contents that the user purchased from the contents server 16 of the contents provider. "March 20 12:30" and "ten times" are entered in the "use limitation information" field; this indicates that "12:30, March 20" and "ten times" are use limitation information included in license information for use limited contents.

While referring to the second row in FIG. 20, "0002" is entered in the "management number" field; this indicates "0002" is the management number used by the contents server 16. "000011" is entered in the "user ID" field, this indicates "000011" is the identification number of a user for the contents server 16. "Hanako Yamada" is entered in the "user name" field, and this indicates that "Hanako Yamada" is the name of a user who purchased use limited contents from the contents server 16 of a contents provider. "112000" is entered in the "license ID" field; this indicates that "112000" is the identification number of a license provided for the licensing data of use limited contents. "000125" is entered in the "contents ID" field; this indicates that "000125" is the identification number of the use limited contents at the contents server 16. "Contents A" is entered in the "contents name" field; this indicates that "contents A" is the name of the use limited contents that the user purchased from the contents server 16 of the contents provider. "February 28 18:00" is entered in the "use limitation information" field; this indicates that "18:00, February 28" is use limitation information included in licensing information for use limited contents.

At step S33, the data processor 72 analyzes the license acquisition request 91, received from the transmitter/receiver 71, by using the licensing data that are managed in and read from the license data database 74. Specifically, based on the user ID, the license ID, the contents ID and the name of the contents that are included in the license acquisition request, the data processor 72 authenticates the user who transmitted the license acquisition request 91, and through analysis, determines that use limitation information to be obtained, in accordance with the license acquisition request 91, indicates "ten days".

At step S34, the data processor 72 uses the analysis results to generate the new licensing data shown in FIG. 21.

For the licensing data shown in FIG. 21, "0002" is a "management number"; this indicates that "0002" is the number used for management by the contents server 16. "000011" is entered under "user ID"; this indicates "000011" is the identification number of a user of the contents server 16. "112000" is a "license ID"; this indicates "112000" is the identification number of a license provided for licensing data for use limited data; "000125" is a "contents ID"; this indicates "000125" is the identification number of use limited contents for the contents server 16. "Contents A" is a "contents name"; this indicates "contents A" is the name of use limited contents that the user purchased from the contents server 16 of a contents provider. "March 11 14:30" is "use limitation information"; this indicates "14:30, March 11" is information concerning a use limitation included in the licensing data for the use limited contents.

The data processor 72 transmits newly generated license data to the license data database 74, and also transmits the new license data to the transmitter/receiver 71.

At step S35, based on the new license data received from the data processor 72, the license data database 74 is updated, as shown in FIG. 22.

While referring to FIG. 22, "112000" in the license ID" field in the second row is updated to "112001", and "February 28 18:00" in the "use limitation information" field is updated to "March 11 14:30".

At step S36, the transmitter/receiver 71 obtains the new licensing data from the data processor 72, and transmits that licensing data to the camera-equipped digital mobile phone 15 via the network 11.

According to the operations performed with the camera-equipped digital mobile phone 15 of this embodiment, the using state notification dialogue 81 (FIGS. 11 and 18) and the contents management table 84 (FIG. 12) are displayed to communicate to the user the information associated state of use that is related to the current using state of use limited contents. However, the notification method is not thus limited. For example, a pop-up screen may be displayed, or an alert sound stored in the storage unit 67 may be generated, depending on the current using state of use limited contents, to communicate to the user the current using state.

Furthermore, for the camera-equipped digital mobile phone 15 of this embodiment, the contents management database in the storage unit 67 is used to manage use limited contents that the user purchased from the contents server 16 of a contents provider. However, the management may be performed for individual use limited contents licensing data stored in the storage unit 67.

The present invention can be applied not only for mobile phones, but also for PDAs (Personal Digital Assistants), personal computers and other information processing apparatuses.

Further, in the embodiment of this invention, the processes have been performed as though included in a time series, in the order shown in the steps of the flowcharts. However, the processes need not always be performed as though in a time series, and the present invention provides for the performance of parallel processing and separate, individual entry processing.

According to the above-embodiment, utilization of use limited contents, for which management is based on licensing information, can be improved.

What is claimed is:

1. An information processing apparatus comprising:
a storage unit configured to store: (i) a content which is limited in use based on license information, the license information being correlated with the content, and the license information having a first time condition limiting the use of the content to a first amount of use, and (ii) a second time condition for receiving notification of a state of use of the content, the second time condition being a second amount of use of the content that is less than the first amount of use;
a control unit configured to determine whether or not the first time condition of the license information is met, and whether or not the second time condition is met;

a notification unit configured to notify a user of information associated with the state of use when the control unit determines that (i) the first time condition is not yet met, and (ii) the second time condition is met, wherein the information associated with the state of use includes a limitation of the content;

a receiving unit configured to receive a command to access the content, which is input by the user in response to the notification;

a request generating unit configured to generate a license acquisition request, when the command is received by the receiving unit, for requesting a server to send updated license information; and a transmitting unit configured to transmit the license acquisition request to the server.

2. The information processing apparatus according to claim 1, wherein the notification unit is configured to notify the user of the information associated with the state of use if the control unit determines that the content is not available.

3. The information processing apparatus according to claim 1, wherein the notification unit includes a display unit configured to display the information associated with the state of use of the content.

4. The information processing apparatus according to claim 1, wherein the notification unit includes an alert sound generator that generates an alert sound in accordance with the state of use of the content.

5. The information processing apparatus according to claim 1, wherein, if the information processing apparatus has been changed from a closed state to an open state, the control unit determines whether or not the content is available.

6. The information processing apparatus according to claim 5, wherein, if an operation key has been pressed, the control unit determines whether or not the content is available.

7. The information processing apparatus according to claim 6, wherein the control unit determines whether or not the content is available when an interrupt event occurs.

8. The information processing apparatus according to claim 7, wherein the control unit determines whether or not the content is available when a power saving mode is changed to a power ON mode.

9. An information processing apparatus according to claim 1, wherein the information associated with the state of use comprises at least one of a period that the contents are available to a user or times that the contents are available to the user.

10. The information processing apparatus according to claim 7, wherein the interrupt event includes an incoming call from another information apparatus and an alarm pre-designated by a user.

11. An information processing apparatus comprising:
a storage unit configured to store: (i) ringtone content, the ringtone content being limited in use based on certain information, and (ii) a time condition for receiving notification of a state of use of the ringtone content;
a playback unit configured to playback the ringtone content when an incoming call is received;
a notification unit configured to notify a user of information associated with the state of use when the information processing apparatus is changed from a closed state to an open state and the time condition is met, wherein the information associated with the state of use includes a limitation of the ringtone content;
a receiving unit configured to receive a command to access the content, which is input by the user in response to the notification;
a request generating unit configured to generate a license acquisition request, when the command is received by the receiving unit, for requesting a server to send updated license information; and
a transmitting unit configured to transmit the license acquisition request to the server.

12. An information processing apparatus comprising:
a storage unit configured to store: (i) wallpaper content, the wallpaper content being limited in use based on certain information, and (ii) a time condition for receiving notification of a state of use of the wallpaper content;
a display unit configured to display the wallpaper content;
a notification unit configured to notify a user of information associated with the state of use when the information processing apparatus is changed from a closed state to an open state and the time condition is met, wherein the information associated with the state of use includes a limitation of the wallpaper content;
a receiving unit configured to receive a command to access the content, which is input by the user in response to the notification;
a request generating unit configured to generate a license acquisition request, when the command is received by the receiving unit, for requesting a server to send updated license information; and
a transmitting unit configured to transmit the license acquisition request to the server.

13. The information processing apparatus according to claim 11, wherein the notification unit is configured to operate when the information processing apparatus is changed from the closed state to the open state and the ringtone content is determined not to be available.

14. The information processing apparatus according to claim 12, wherein the notification unit is configured to operate when the information processing apparatus is changed from the closed state to the open state and the wallpaper content is determined not to be available.

15. The information processing apparatus of claim 1, wherein the second time condition for receiving the notification of the state of use of the content is settable by the user.

16. The information processing apparatus of claim 11, wherein the second time condition for receiving the notification of the state of use of the content is settable by the user.

17. The information processing apparatus of claim 12, wherein the second time condition for receiving the notification of the state of use of the content is settable by the user.

18. The information processing apparatus of claim 1, further comprising:
an updated license information reception unit configured to receive the updated license information sent from the server; and
an updating unit configured to update the license information stored in the storage unit with the updated license information received by the updated license information reception unit.

19. The information processing apparatus of claim 1, further comprising:
an updated license information reception unit configured to receive the updated license information sent from the server; and
an updating unit configured to update the license information stored in the storage unit with the updated license information received by the updated license information reception unit.

20. The information processing apparatus of claim 1, further comprising:

an updated license information reception unit configured to receive the updated license information sent from the server; and an updating unit configured to update the license information stored in the storage unit with the updated license information received by the updated license information reception unit.

* * * * *